United States Patent
Bowen

[15] 3,685,210

[45] Aug. 22, 1972

[54] APPARATUS FOR LENS GENERATION

[72] Inventor: Gilbert John Bowen, 58 Browning Rd., Rugby, England

[22] Filed: Sept. 9, 1970

[21] Appl. No.: 70,770

[30] Foreign Application Priority Data

Sept. 16, 1969 Great Britain...........45575/69

[52] U.S. Cl. ..................51/33 W, 51/124 L, 51/284
[51] Int. Cl. ..............................................B24b 13/00
[58] Field of Search..........................51/124, 284, 33

[56] References Cited

UNITED STATES PATENTS 2,633,675   4/1953   Ellis .........................51/124 L
2,766,559   10/1956  Pixley ........................51/33 W
2,806,327   9/1957   Coburn ....................51/124 L

*Primary Examiner*—Harold D. Whitehead
*Attorney*—Mawhinney & Mawhinney

[57] ABSTRACT

Apparatus for generating lenses is intended to overcome the problem of the lens breaking as the cutter tool is traversed across the lens. Drive means for moving the lens towards and away from the cutter tool during a cutting operation, is controlled so that, during the initial traverse of the cutter tool, the lens is backed off from the cutter. Before the return traverse the lens is moved back towards the cutter tool so that the tool removes the remaining thickness from the lens. The drive means takes the form of a double-acting piston and cylinder device including two pistons.

7 Claims, 4 Drawing Figures

INVENTOR
GILBERT JOHN BOWEN

APPARATUS FOR LENS GENERATION

This invention relates to apparatus for lens generation and particularly, but not exclusively, to apparatus for generating optical lenses.

When using apparatus for generating convex or concave surfaces of lenses difficulty can occur when the cutting mechanism has traversed the first half of the lens surface and is approaching the edge of the lens on completion of the traverse since the edge of the lens may break off.

An object of the invention is to provide apparatus for generating lenses which obviates the above difficulty automatically and according to a desired method of operation.

According to the invention apparatus for lens generation comprises, a lens holder, a cutter tool holder, fluid-operated drive means for moving the lens holder towards and away from the cutter tool holder, and control means for controlling the operation of the drive means during generation of a lens so that the lens holder is backed-off from the cutting tool holder during a first cutting traverse of the cutting tool holder and the lens holder is moved towards the cutting tool holder prior to a return cutting traverse of the cutting tool holder.

Preferably the drive means includes a piston and cylinder device, a feed of pressure fluid to or from the device causing the lens holder to move towards or away from the cutter tool holder.

In this way the movement of the carriage can be controlled so that during a traverse of the cutter across the lens blank, the lens blank is moved away from the cutter at a controlled rate, and before subsequent traverse of the cutter in the opposite direction across the lens blank, the lens blank can be moved forward to its initial position in relation to the cutter.

According to a further feature of the invention the drive means is urged by resilient means towards the backed-off position, movement of the lens holder towards the cutting tool holder being effected by the introduction of pressure fluid into the drive means.

Conveniently a restrictor in the outlet for fluid from the drive means whereby the backing-off movement is at a rate determined by the restrictor.

The piston and cylinder device may comprise two pistons one of which is arranged to restrict the movement of the other piston during the first cutting traverse so that the lens holder cannot move towards the cutting tool holder to the full extent of its travel during said first cutting traverse, the lens holder being connected to said other piston.

The two pistons may be coaxially arranged, said other piston being located between axially spaced abutments on said one piston and the pistons each having a separate pressure fluid supply inlet.

The fluid supply to the two pistons may be controlled by electrically-operated valves providing for flow of fluid to and from the pistons along said inlets.

Further features of the invention appear from the following description of an embodiment of the invention given by way of example and with reference to the drawings in which.

Figure 1:
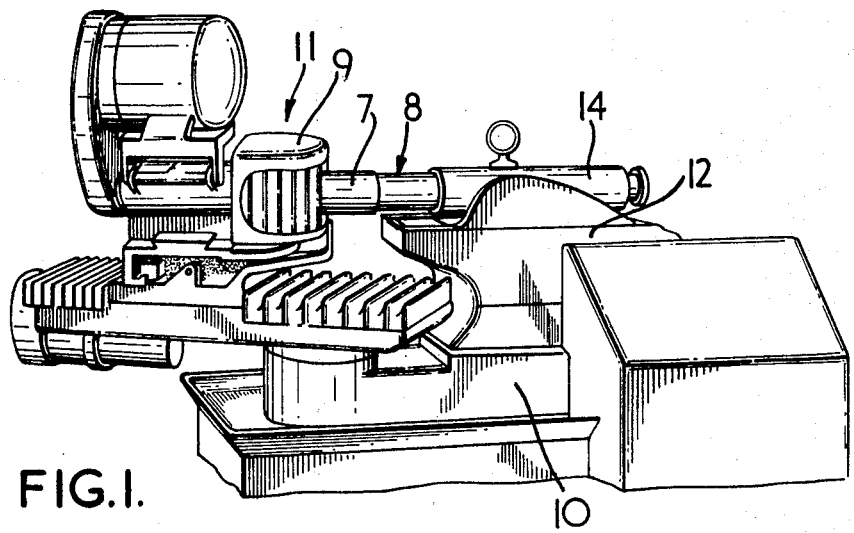
FIG. 1 is a perspective view of apparatus for generating lenses.
Figure 2:
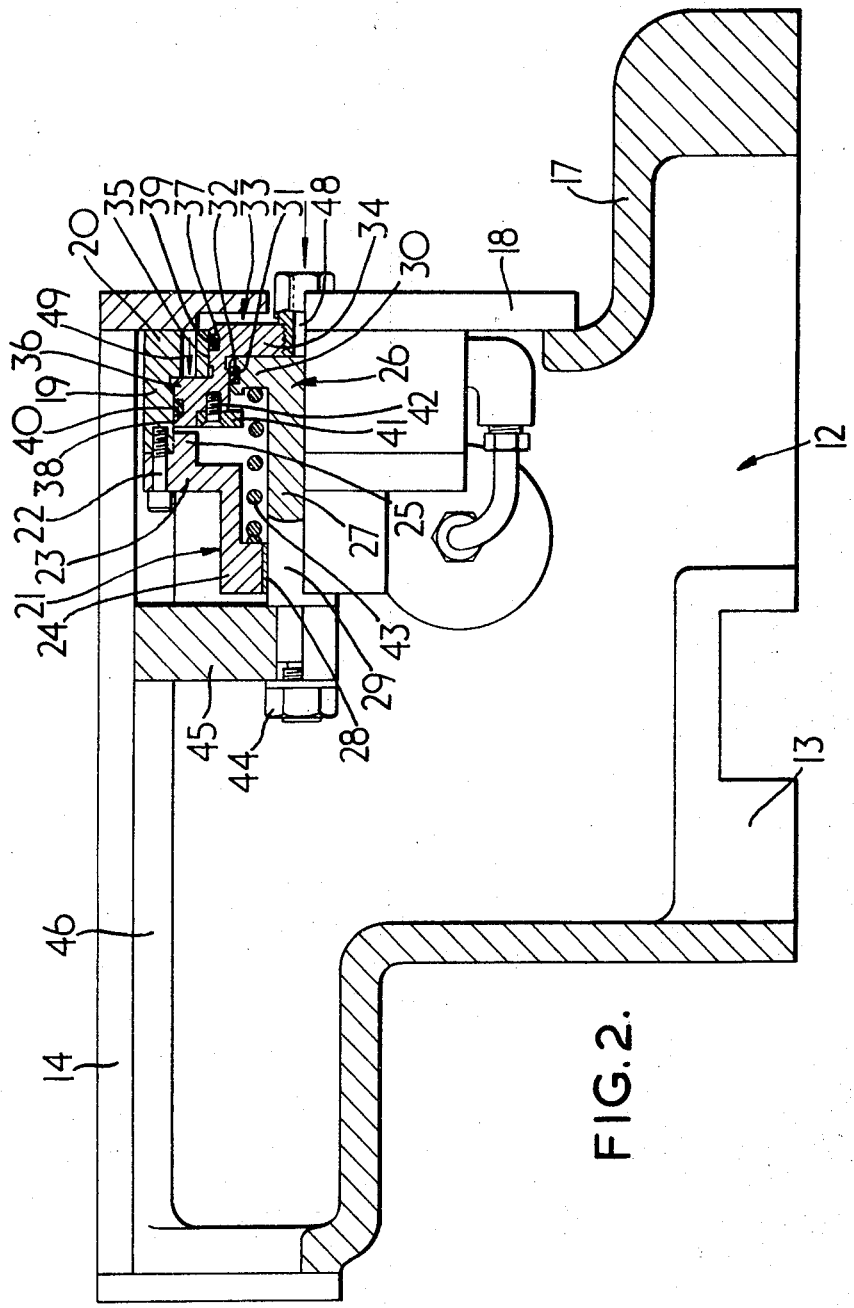
FIG. 2 is a part-sectioned elevation of a tailstock of the apparatus of FIG. 1.

Referring to the drawings and firstly to FIGS. 1 and 2, apparatus for lens generation has a base 10 fitted with slide rails on which a tailstock support, indicated generally by 12, is movable in known manner. The apparatus also includes a headstock 11 of known form and including a cutter tool 60 (FIG. 4) located in a housing 9 and which is rotated to act on a lens blank mounted on a tailstock 8 in known manner, the tailstock being mounted on the support 12.

The tailstock support 12 has a body part 13 which may be regarded as fixed in relation to the cutter tool when in the cutting position, and a carriage 14 (only part of which is shown) which is slidably-attached to the body part through a dovetail joint (not shown). The carriage is movable horizontally relative to the body 13 and carries the tailstock 8 on which is mounted a lens blank on a collet chuck or lens holder 7. The chuck 7 is movable axially relative to the carriage by way of an adjustment device (not shown) in known manner, and the lens blank is thereby positioned in relation to the cutter tool so that the desired thickness of glass can be removed from the edges and center of the lens in accordance with the desired curvature of the lens. The position of the cutter tool relative to the lens blank is also selected according to the kind of lens surface to be formed, for example a convex or concave surface and during operation the cutter tool and its associated housing is traversed across the lens in known manner.

The body part 13 includes a casing 17 having an end plate 18 to which is secured a cylindrical member 19 having an integral inner abutment 20 and shown sectioned along its center line in FIG. 2. A further cylindrical member 21 is secured to the member 19 by bolts 22 and defines a cylindrical portion 23 and a further cylindrical portion 24 of smaller diameter than the portion 23. An abutment 25 is formed integrally with the member 21.

A composite piston and piston rod 26 is located within the members 19 and 21 and includes a rod part 27 which is movable axially and is slidable through a bush 28 located between a stem of the piston rod part 27 and the member 21. The piston 26 is formed with an annulus or piston 30 extending radially outwardly of the piston rod 27, the periphery of the annulus being formed with a groove 31 for receiving a seal 32.

A further composite piston part 33 is located co-axially of the part 26 and around the annulus 30 and includes an inner disc-like portion 34, a cylindrical portion 35 and an outer disc-like portion 36. The portions 34 and 36 are formed with grooves 37 and 38 respectively for receiving sealing rings 39 and 40 respectively. The part 33 is axially movable between postions in which the portion 36 at one side bears on the surface of the abutment 20, and in which the portion 36 at the opposite side bears on the abutment 25. The piston part 33 carries an inwardly-directed annular disc 41 secured by screws 42 to the portion 36, the disc 41 serving as an abutment to restrict relative movement between the parts 33 and 26.

A spring 43 is located around the stem 29 and at one end the spring bears on the end of the cylindrical portion 24 and at the other end the spring bears on the side of the annulus 30 so as to urge the piston part 27 towards a retracted position, i.e. towards the right as shown in FIG. 2.

The piston rod 27 is secured by a nut 44 to a plate 45, which is secured to the carriage 14 for movement, on extension and retraction of the pistons 26 and 33 in the associated cylinder, with the carriage 14 to which the collet chuck is attached.

The piston 26 has a surface of the annulus 30 in communication with a combined fluid inlet and outlet 48 through which pressure fluid is admitted and discharged from the piston and cylinder to move the part 26 axially relative to the casing 17 between the abutment disc 41 and the disc portion 34 of the piston part 33.

The right hand annular surface of the disc-like portion 36 of the piston part 33 is in communication with a further combined fluid inlet and outlet 49 through which pressure fluid is admitted and discharged to move the part 33 axially relative to the casing 17 between a position in which the right hand face of the portion 36 is in contact with the abutment 20 as shown in FIG. 1, and a position in which the left hand face of the portion 36 is in contact with the abutment 25. The piston part 33 can only be moved towards the left when the piston 26 has been moved from its retracted position.

Figure 3:
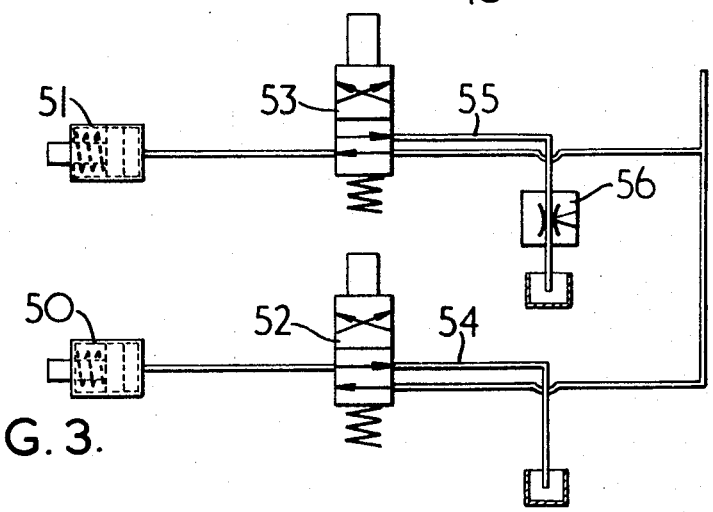
FIG. 3 is a hydraulic circuit diagram.

Referring now to FIG. 3, the piston 33 and associated cylinder of FIG. 1 is shown diagrammatically and is indicated by 50, and the piston part 26 and associated cylinder is also shown diagrammatically and is indicated by 51. The piston and cylinders 50 and 51 are arranged for communication with a source of fluid pressure through respective two position solenoid-operated valves 52 and 53, and these valves also enable the piston and cylinders 50 and 51 to be selectively connected to exhaust through return lines 54 and 55 respectively. The piston and cylinder 51 is connectable to exhaust through a variable restrictor 56 whilst the piston and cylinder 50 is connectable directly to exhaust. In the position shown, the valve 53 is communicating the source of pressure fluid with the cylinder 51. On change over of the valve 53 the cylinder inlet is connected to exhaust to retract the piston under the action of the associated spring 43, the fluid passing to exhaust through the restrictor 56 at a predetermined rate. In the position shown, the valve 52 is connecting the cylinder 50 directly with exhaust so that the piston is retracted under the action of the spring 43. On changeover of the valve 52 the cylinder is connected with the source of pressure fluid to extend the piston.

Figure 4:
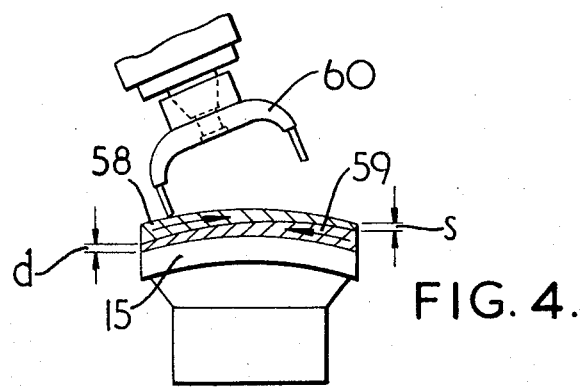
FIG. 4 is a diagrammatic view of a lens blank showing the thicknesses removed from the blank during a cutting action on the blank.

Referring now to FIG. 4 the cutting action of a cutting tool is illustrated in relation to a lens blank 15 for a convex lens. The cutting tool commences cutting the blank 15 at one edge of the blank at a position spaced a distance $d$ from the desired eventual thickness of the lens and is traversed towards the opposite edge of the blank taking off a thickness of glass 58 from the lens. If the tool were to take the same thickness off the blank at said opposite edge of the blank as on the starting edge the lens may be broken and made unfit for use, so the tool is "backed off" as it approaches the opposite edge of the blank and takes a relatively narrower thickness $s$ of glass 58 from said opposite edge. The tool then makes a reverse traverse of the blank to remove a layer 59, the tool this time taking the remainder of the full desired thickness of the blank over the whole width of the blank until the blank has been fully cut.

The action of the apparatus in effecting this "backing off" operation automatically is now described with reference to FIGS. 2 and 3. Initially and prior to the cutting tool operating, the collet chuck and associated lens blank are positioned relative to the cutting tool 60 by the adjustment device. The piston and cylinder device in the casing 17 is brought into use and the valve 53 is operated to the position shown in FIG. 3 to extend the piston 26 from the associated cylinder a distance equal to the stroke of the piston part so that the annulus abuts the disc 41. The valve 52 is operated to the position shown in FIG. 2 so that the piston 33 is moved towards the right, as shown, against the abutment 20 under the action of the spring 43. Thus the piston portion 36 is spaced from the abutment 25 and this spacing determines the thickness $d$ (FIG. 4). Simultaneously with the initiation of the cutting operation the valve 53 is operated to a position in which fluid can be exhausted through the restrictor 56 at said predetermined rate. In this way the lens is gradually backed off from the cutter 60 as the cutter is operated and traversed across the lens so that the tool takes the smaller thickness $s$ (FIG. 3) from the edge of the lens towards which the tool 60 is being traversed than at the edge at which the cutting operation was initiated. On commencing a reverse traverse of the tool across the lens blank the valve 53 is again operated to extend the piston 26, and this time the valve 52 is also operated to extend the piston 33. The pistons 26 and 33 are held in their extended positions whilst the tool traverses the lens and the tool thereby takes the remaining thickness from the whole width of the lens including the thickness $d$. It will be noted that the piston 26 is able to move towards the left, as shown a further short distance, equal to the thickness $d$, on the reverse traverse of the tool due to the movement of the piston 33 against the abutment 25.

The thickness $s$ removed from the trailing edge of the lens during the first traverse of the tool is selected according to the type of glass forming the lens and other variable factors. The thickness $s$ may be varied by varying the orifice of the restrictor 56.

It may be appreciated that the "backing off" operation may be effected without the provision of the piston 33. However the provision of the piston 33 readily enables the thickness $d$ to be left on the leading edge of the lens on commencement of the first traverse of the tool. This gives the benefit that the tool gives a relatively smoother cut over the leading portion of the lens than would be the case if a full thickness were removed at the leading edge of the lens on the first traverse of the tool.

The apparatus described is particularly for use in generating toric lenses but it will be appreciated that the invention can be applied to other lens generating apparatus. In such other apparatus the lens holder can be attached to and in alignment with the axis of the piston and piston rod 26.

What I claim as my invention and desire to secure by Letters Patent of the United States is:

1. Apparatus for lens generation comprising, a lens holder, a cutter tool holder, fluid-operated drive means for moving the lens holder towards and away from the cutter tool holder, and control means for controlling the operation of the drive means during generation of a lens, so that the lens holder is backed-off from the cutting tool holder towards the end of a first cutting traverse of the cutting tool holder and the lens holder is moved towards the cutting tool holder prior to a return cutting traverse of the cutting tool holder, thereby obviating fracture of the edge of the lens.

2. Apparatus according to claim 1 wherein the drive means includes a piston and cylinder device, a feed of pressure fluid to and from the device causing the lens holder to move towards or away from the cutter tool holder.

3. Apparatus according to claim 1 wherein the drive means is urged by resilient means towards the backed-off position, movement of the lens holder towards the cutting tool holder being effected by the introduction of pressure fluid into the drive means.

4. Apparatus according to claim 1, wherein the control means includes a restrictor in an outlet for fluid from the drive means whereby the backing-off movement is at a rate determined by the restrictor.

5. Apparatus according to claim 1 wherein the drive means includes a piston and cylinder device which comprises two pistons one of which is arranged to restrict the movement of the other piston during the first cutting traverse so that the lens holder cannot move towards the cutting tool holder to the full extent of its travel during said first cutting traverse, the lens holder being connected to said other piston.

6. Apparatus according to claim 5 wherein the two pistons are coaxially arranged, said other piston being located between axially spaced abutments formed on said one piston and the pistons each having a separate pressure fluid supply inlet.

7. Apparatus according to claim 5 wherein the fluid supply to the piston and cylinder device is controlled by electrically-operated valves providing for flow of fluid to and from the pistons along a fluid supply inlet for each piston.

* * * * *